United States Patent [19]
Ivansson

[11] 3,774,672
[45] Nov. 27, 1973

[54] ARRANGEMENT FOR REMOVAL OF MOULDED SIZED PIECES FROM A PRESS MOULDING MACHINE

[75] Inventor: Hans Valdemar Ivansson, Herrljunga, Sweden

[73] Assignee: A. H. Anderson & Co., Aktiebolag, Ljung, Sweden

[22] Filed: July 14, 1971

[21] Appl. No.: 162,338

[30] Foreign Application Priority Data
July 22, 1970 Sweden.............................. 10107/70

[52] U.S. Cl. ................................................. 164/344
[51] Int. Cl. ............................................... B22d 17/22
[58] Field of Search..................... 164/341, 344, 303, 164/328, 401, 404, 412, 131, 145, 180, 181, 343, 345, 346, 347

[56] References Cited
UNITED STATES PATENTS

| | | | |
|---|---|---|---|
| 3,454,991 | 7/1969 | Rees | 164/344 X |
| 2,129,351 | 9/1938 | Falmmang | 164/346 |
| 2,791,014 | 5/1957 | Saives | 164/347 X |
| 3,442,323 | 5/1969 | Lewis | 164/347 X |
| 2,301,819 | 11/1942 | Sambrook | 164/347 X |
| 3,488,692 | 1/1970 | Oda | 164/401 |
| 3,522,838 | 8/1970 | Ott | 164/344 X |
| 3,268,961 | 8/1966 | Clark | 164/344 |
| 3,319,703 | 5/1967 | Heim | 164/344 |
| 3,334,378 | 8/1967 | Scherrer-Wirz | 164/347 X |

*Primary Examiner*—Overholser J. Spencer
*Assistant Examiner*—John S. Brown
*Attorney*—Larson, Taylor & Hinds

[57] ABSTRACT

A press moulding machine includes a fixed mould portion and a horizontally moveable mould portion moveable in a linear horizontal direction between open and closed positions with the mould portions, respectively, spaced apart or in engagement. The device also includes means for removing a moulded object from the space between the fixed and moveable mould portions. The object removal means includes a gripper member including a gripping element at one end for grippingly engaging a moulded object adjacent the moveable mould portion, and means for moving the gripping member in a horizontal direction for moving the gripping element between an object gripping position adjacent the moveable mould portion in the space between the fixed and moveable mould portions and a withdrawn position remote from the space, the path of the horizontal motion of the gripping element including a first portion extending from the object gripping position in the linear horizontal direction of motion of the moveable mould portion to a position intermediate the fixed and moveable mould portions, and a second portion extending horizontally away from the space between the fixed and moveable mould portions to the retracted positions.

6 Claims, 1 Drawing Figure

PATENTED NOV 27 1973
3,774,672
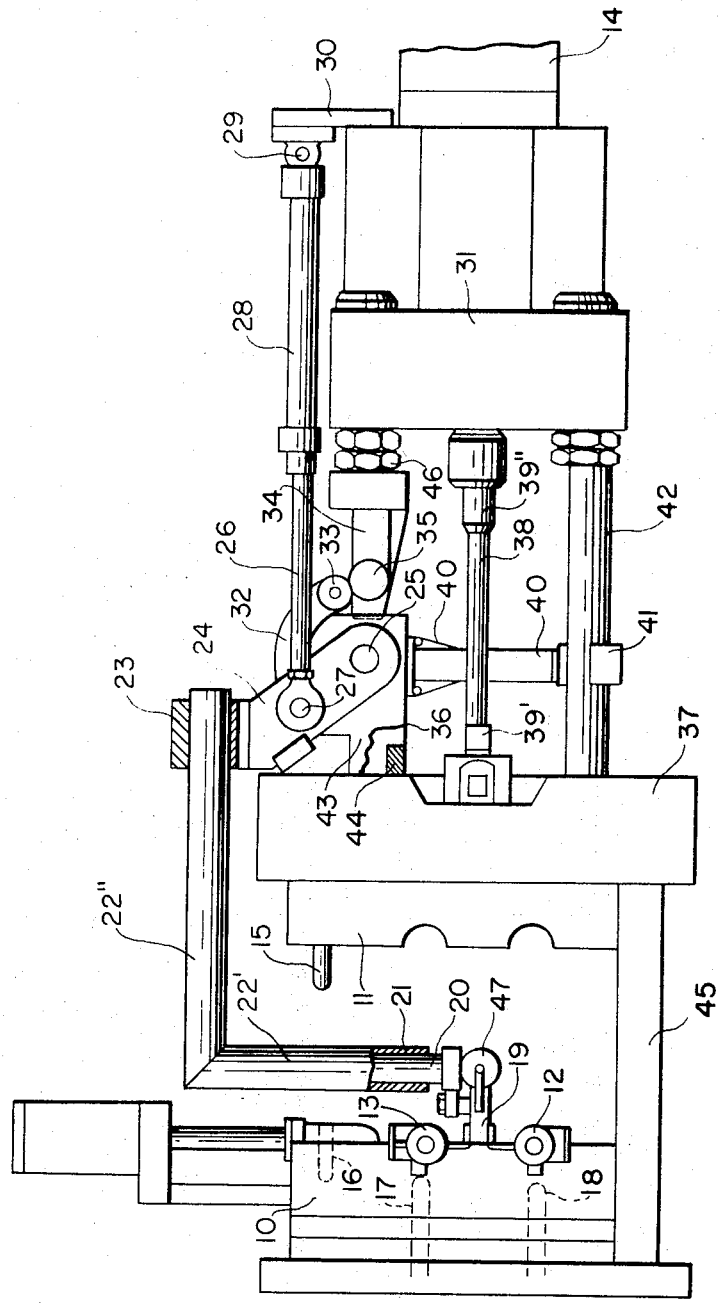
INVENTOR
HANS VALDEMAR IVANSSON
*Larson, Taylor and Hinds*
ATTORNEYS

ARRANGEMENT FOR REMOVAL OF MOULDED SIZED PIECES FROM A PRESS MOULDING MACHINE

In press moulding, especially of objects of brass, bronze or similar metal, it is desirable to make the moulding procedure automatic. The mould is usually made in two main parts, perhaps with a complement of a number of core parts, and during moulding, these parts are brought together, whereafter material, preferably molten metal, is moulded in the mould cavity. After the moulding has been completed, the moulded object has to be removed from the mould, which is accomplished by moving the two half parts of the mould apart, drawing out the core parts, which may have been used and actuating pushers, so that the moulded object is thrown out from the mould. However, it is then necessary to carry away the moulded object in order to move it to a storage area, a conveyor or the like. Doing this by hand may take a long time. It has also been difficult to make the moulding procedure completely automatic, because such a full-automatic moulding procedure requires that there is a fixed space of time between each separate moulding, during which a moulded object should be completely removed from the machine prior to the next operation. However, this could not be insured when the moulded object is removed manually.

For this reason there has already been proposed an arrangement which was specifically intended for removal of rather heavy press-moulding parts. This arrangement, however, is not suitable for removal of small pressmoulding parts in a quick press moulding procedure, because the movement which the gripper has to execute will, due to the heavy weight of the material, be too complicated.

The known arrangement, which is described for instance in the German patent specification 1.271.908, works in such a way that the empty gripper if swung up from a position completely outside of the press-moulding machine in a circular path in the vertical direction, is thereafter subjected to a swinging movement in a circular path in the horizontal level so that it will be situated at least approximately above the moulded object to be collected, and thereafter is lowered along a renewed circular path down in the interspace between the fixed and the movable mould, where the material is engaged by the gripper. The German patent specification is not quite clear regarding how the gripper thereafter removes the material.

In other known arrangements of this kind, however, the removal takes place in such a way that the material is first elevated along the circular path, forming the third path, along which the gripper moved, when it should collect the object. Thereafter the gripper along with the material is turned along the horizontal path, and thereafter the gripper along with the material is lowered along the first mentioned, vertical, circular path, and thereafter the material is released.

Thus, a very complicated arrangement is used, which depends upon the face that the material is very heavy, and this complicated arrangement further requires means for the displacement of the material sufficiently strong and powerful that these can elevate the material from the interspace between the two mould parts, horizontally displaced in relation to each other. This elevation movement in combination with the remaining conveyor movement takes so long a time that it is not feasible to use such apparatus for conveying lighter moulding material.

The present invention is based upon the idea that one should for usch lighter moulding material avoid all movement in the vertical direction of the material when collecting it from the interspace between the two half-parts of the mould, so that this movement should exclusively take place in the horizontal direction. Further, the number of phases of movement should be limited to a minimum, and these should be mechanically interconnected in such a way that they will follow each other in quick order. Only thereby one can increase the speed of the machine and thereby its working capacity.

The present invention thus refers to an arrangement for removal of moulded form pieces from a press-moulding machine having a fixed mould part and a horizontally movable mould part.

According to the invention a gripper is provided on an arm, which, under influence of a servo motor, can execute a combined movement, comprising two phases of movement, viz. one movement in the horizontal level in the same or at least substantially the same direction as the direction of movement of the machine during the press-moulding, and also a swinging movement in the horizontal level for driving the gripper into or out from the space between the two parts of the mould in synchronism with the press-moulding machine work, so that the gripper will be brought into this space, when the mould is open, but, carrying the moulded form piece, be brought out of the space along the same path of movement but in the opposite direction, immediately before the mould is again closed for a renewed press-moulding operation. Said arm for carrying up the gripper is thereby provided in connection with an arm, oscillatable about a vertical shaft, the turning centre of which is movably connected with the fixed mould part, and the movement of which is controlled by means of the piston bar of a servomotor, determining the movement of the gripper.

Press moulding machines for automatic press moulding are, as a rule, hydraulically servo-motorically controlled, but some other kind of control may be used. The invention, of course, is not limited to the specific kind of control used in a press moulding machine. Whatever type control is used, it is only essential to the invention that removal of the moulded objects should be controlled in synchronism with the remaining parts of the press moulding machine.

The invention will be further described below in connection with a form of execution shown in the attached drawing, but it is understood that the invention is not limited to this specific form of execution and that all different kinds of modifications thereof may exist within the scope of the invention.

The drawing is a diagrammatic plan view of a press moulding machine according to the present invention. In the drawing, the control means for the moulding section of the press moulding machine are not shown, because these means may be of conventional kind, well known to the man skilled in the art.

The drawing depicts the device at a time after a moulded object has been removed The machine is therefore in "open" state, which means that the two mould parts 10 and 11 are spaced a distance from each other, as indicated in the drawing. It is further assumed that the moulded material shall have such a form that, in addition to mould parts 10 and 11 two core parts 12 and 13 are also required. These core parts are arranged movable in a plane, perpendicular to the one in which the mould part 10 is movable, and in the drawing now described it is assumed that the core parts 12 and 13 have been lowered into a position under the level of the paper in the drawing figure. For making a new moulding procedure possible, the mould part 10 is moved against the fixed mould part 11 by means of a servo motor, preferably a hydraulically controlled servo motor not shown in the drawing. During the last part of this movement, usually, four guide pins are used, of which only the guide pin 15 is visible in the drawing, entering into holes for guiding the contact between the mould parts 10 and 11. The guide pin 15 is applied on the fixed mould part 11 and enters into a hole 16 in the movable mould part 10 in the form of execution of the invention shown in the drawing, but of course, this is not important, and the disposition may be the opposite. Either simultaneously with the movement of the mould part 10 to the right in the drawing or immediately before or after this movement, the core parts 12 and 13 are also moved up into the mould cavity, so that the cavity will get the desired form. The pouring of the molten metal under pressure takes place thereafter by means of a servo motor 14 in a manner, conventional in press moulding machines. After heat has been conducted away in such a way that the moulded detail has solidified, but nevertheless still is too hot to be contacted with naked hands, the mould is again opened by the core parts being drawn apart and the mould part 10 being moved at left by a servo motor not shown. By means of a servo motor, which is not shown in the drawing, simultaneously a pair of throwers 17, 18 are controlled in such a way that they will throw out the moulded detail from the movable mould part 10. In order that one shall be sure that the moulded detail will remain within mould part 10, which is provided with said throwers 17, 18, it is suitable to cause a given time difference between the drawing back of the mould part 10, on the one hand, and of the core parts 12 and 13, on the other hand, so that the core parts will retain the moulded detail within mould part 10, during the time when the mould part 10 is moved to the left in the drawing.

The arrangement described above is known in the art. In the known arrangement it has been necessary by means of a pair of tongs to catch the moulded object by hand at the moment when it is thrown out from the mould part 10 by means of the throwers 17, 18 and to then bring it to another place, for instance a moving band, a storage case or the like. Attending to the time for the throwing out, however, puts very hard demands on the moulder, and it often happens that the moulder misses the actual time, whereby the moulded detail will fall down, perhaps in such a position that it will be difficult to catch the detail with a pair of tongs. It also happens sometime that there will be a considerable time required to correct the error thus created. One will perhaps have to use a pair of tongs formed in another way, in order to put the detail in such a position that it can thereafter be caught by an ordinary pair of tongs, and during this time the full-automatic procedure in the press moulding machine is disturbed. If operation continues, it may happen that the detail gets clamped between the two mould half parts at their renewed closing, and both the detail and the mould parts may be damaged. The operator therefore must immediately at such a "miss", as described above, take steps to stop the press moulding machine, and also these steps will take a given time. Thereafter he will have to start the machine anew, after the missed subject has been removed in due order.

It will be understood from the above that there is a very great advantage to gain, if one can control the gripper tong fully automatically in synchronism with the remaining parts of the press moulding machine, so that its work will continue undisturbed.

The gripper tong according to the present invention may be of any suitable type. In most cases it has to be adjustable and formed in a different way for each separate injection piston diameter moulded in the press moulding machine, so that, when changing this one, will also have to change insertions in the grip pair of tongs. The details therefore are only schematically indicated at 19 in the drawing. In order for an easy adjustment and setting, the pair of gripper tongs is arranged on a control shaft 20, which is adjustable in the hollow end 21 of a control arm 22', 22", which is angularily bent. The arm part 22' runs in the position of attack shown in the drawing at least substantially perpendicularily to the working direction of the machine, whereas the arm part 22" in the position shown in the drawing runs at least substantially parallel to the said working direction. The arm part 22" is adjustably mounted at a block 23 at the free end of an oscillatable arm 24, guided about a guide bolt 25, and controlled by means of a drawer bar 26, which also forms the piston bar of a servo motor 28. The drawer bar 26 is linked to the arm 24 by means of a link bolt 27. The servo motor 28 in turn is guidingly hinged by means of the link bolt 29 to a part 30 in connection with the injection unit.

The arm 24 carries a circular guide path 32, which carries up at its end a pulley 33. A spring, which is not shown in the drawing, is applied in such a way that it tends to turn the arm 24 along with the guide path 32 and the pulley 33 in clockwise direction, but this turning is stopped by the pulley 33 contacting the fixed guide path 34 in connection with the means 31, said guide path being finished at its end turned onto the servo motor 14 by a second pulley 35.

The link bolt 27 is arranged in a block 36, which is carried up by a bracket 40, the other end of which being ended with a slide sleeve 41, embracing a guide rail 42. The block 36 further is provided with a support 43, which is provided with a damper arrangement and is intended to carry up the static load of the arms 24 during the controlled, linear movement under influence of the servo motor 28. The consequence of this construction is that the block 36 along with the parts carried up by the block, comprising the arm 22', 22", the arm 24, and the circular segment 32, may execute a linear movement under influence of the servo motor 28, said movement being controlled by the meshing between the support 43 and the contact with the arm 24 as well as between the bracket 40 with its guide sleeve 41 and the guide rail 42.

The piston bar 38 is connected to the piston in the servo motor 14. For adaption to different moulds of different magnitude the piston bar is provided with exchangable injection pistons 39' having different diameter, so that the filling amount may be varied. The mould holder 37 is connected with usually four guide rails 45, only one of which is visible in the drawing.

The arrangement now described functions in the following way:

It is assumed that the described arrangement is in the position, in which it is shown in the drawing figure. In this state one working piece has just been moulded between the mould parts 10 and 11 with cavities, determined by the core parts 12 and 13. By influence from the servo motor not shown, the mould part 10 has been drawn back, and by influence from the servo motor 28 the gripper pair of tongs 19 has been brought into the interspace between the mould parts 10 and 11 in such a position that it will embrace the working piece just moulded, when this one moment later is thrown out by the throwers 17 and 18 from the mould part 10.

The throwers 17 and 18 are controlled by means of servo motors, which are not shown in the drawing, because this thrower arrangement is well known in the art. Up to this time, the throwers were often manually controlled by the moulder having to press on a push bottom or to press down a pedal, which called upon a valve for pressure medium to the valve influenced servo motor controlling the throwers. In the invention, however, it is assumed that the control of the last mentioned valve takes place centrally by means of a time-controlled program, so that at the correct moment, the moulded work piece is thrown out to be caught by the gripper pair of tongs 19. This shall now be brought out from the interspace between the two mould parts 10 and 11, which takes place as explained below.

The feed of pressure air to the servo motor 28 is reset by the central program control in such a way that pressure air is fed to the left side of the piston of the servo motor, and is released through a choke valve for controlling the working speed of the servo motor from the right side of the piston. The piston bar 26 thereby is displaced to the right in the drawing, thereby also moving the arm 24. At this time, however, arm 24 cannot turn about its turning centre 25, because such turning is prevented by means of the circular segment 32, which with its pulley 33 contacts a guide rail 34. Therefore, a parallel movement will take place in the same direction as the above mentioned working axis of the machine, until the moulded working piece has been released in a satisfactory way from the mould part 10. At this time, however, the pulley 33 will have got to the end of the guide rail 34, where it will move down along the peripheray of the pulley 35 attached to the guide rail 34. Simultaneously, the continuous linear movement of the arm 24 is stopped by an adjustable member 46, and the continued movement of the piston bar 26 therefore causes the arm 24 to be turned about its centre 25 simultaneously as the circular segment 32 with the pulley 33 carried up by said segment is moved into the interspace between the pulley 35 and the member 46. This turning is transferred to the construction of the arm 22', 22", of the block 23, so that the pair of tongs 19 with the moulded work piece is swung out from the interspace between the two mould half parts 10 and 11. A micro switch not shown in the drawing is arranged in the most remote position of the arm 22', 22" to influence a control valve, which will in turn influence a means 47 on the pair of tongs 19 in common with the thrower servo motor, so that this is opened and will release the work piece, and so that this will fall down into some collection means, for instance a slide, which transfers the working piece to another area.

Rather immedaitely after the arm 22', 22" has been brought out from the interspace between the movable mould part 10 and the fixed mould part 11, pressure air or other pressure medium is fed to the side of the servo motor not shown, which is to the left of the movable mould part 10, and mould part 10 will be brought over to the rignt, so that the two mould parts 10 and 11 are again closed against each other. The servo motor controlling the two core parts 12 and 13, will obtain pressure medium through the common valve programming apparatus before or after the said closing movement, and the core parts 12 and 13 will be brought up into their position in the interior of the mould cavity suitable for moulding. A renewed moulding will thereafter take place by means, which do not form any part of the present invention, and which have, for this reason, not been shown in the drawing.

After the moulding has been completed, and the moulded work piece has got so cold that it has solidified to a sufficient degree to be collected from the mould without deformation, the mould part 10 is moved to the left by the servo motor not shown, so that the mould is opened, and pressure medium is fed to the servo motor 28 so that its piston bar 26 will be displaced to the left in the drawing. The movement of the control arm 22', 22" thereby first turns arm 24 about its turning centre 25, guided by means of the circular segment 32, until the pulley 33 has past the pulley 35, whereafter the arm 24 is locked in its assumed angular as shown. During this movement, the arm 22', 22" has been turned in counter-clockwise direction, until the pair of catcher tongs is placed exactly opposite to the working piece just moulded but still a distance therefrom. During the continued linear movement, the pair of catcher tongs is brought against the working piece, until it meshes with the working piece, and core parts 12, 13 are drawn downwardly, so that they will not prevent the release of the work piece from the mould part 10. The throwers 17, 18 thereafter enter into action and release the work piece, which is immediately caught by the pair of catcher tongs 19, whereafter the procedure just described is repeated.

It will be evident from the above that the collection of the moulded working piece takes place completely automatically and in complete synchronism with the moulding procedure, so that no loss of time needs to occur during the removal of the work piece. The removal, further, takes place by means of tools without necessity for the person to touch the working piece by his hands, and therefore the procedure can take place at a time, after the molding procedure, when the working piece has cooled to a less degree than was earlier regarded as unavoidable.

I claim:

1. In a press moulding apparatus including a fixed mould portion, a horizontally moveable mould portion, means for moving said moveable mould portion in a linear horizontal direction between open and closed positions, said mould portions being spaced apart out of engagement when in said open position and in engagement when in said closed position forming a mould cavity therebetween, and means for removing a moulded object from the space between the fixed and moveable mould portions when in said open position; the improvement wherein said object removing means comprises a gripper member comprising a gripping element at one end for grippingly engaging a moulded object adjacent said moveable mould portion, means for moving said gripping member in a horizontal direction for moving said gripping element between an object gripping position adjacent said moveable mould portion in the space between said fixed and moveable mould portions and a withdrawn position remote from said space, the path of said horizontal motion of said gripping element including a first portion extending from the object gripping position in the linear horizontal direction of motion of said moveable mould portion to a position intermediate said fixed and moveable mould portions, and a second portion extending horizontally away from that space between said fixed and moveable mould portions to said retracted positions, and control means for synchronizing the motion of said moveable mould portion moving means and said moulded object removal means such that the moulded object removal means is moved into said object gripping position after said moveable mould portion is moved into the open position and is moved into said withdrawn position prior to moving said moveable mould portion to the closed position.

2. Improved press moulding apparatus according to claim 1 wherein said object removal means comprises an arm mounted at one end for rotation about a vertical axis and includes means for preventing rotation of said arm about said vertical axis during motion of said gripping element in said first portion of said path of horizontal motion.

3. Improved press moulding apparatus according to claim 2 wherein said vertical axis is positioned in a mounting member mounted for horizontal motion in the linear direction of said moveable mould portion.

4. Improved apparatus according to claim 2 wherein said gripping member moving means comprises a hydraulically actuated arm connected to said gripping arm.

5. Improved apparatus according to claim 2 in which a circular segment is provided in fixed connection with said gripping arm and is arranged with an end penetrating out from said gripping arm to run along a path running at least substantially parallel to said linear horizontal direction, and, after having arrived at the end of said path to run with a cam contour along the said end simultaneously turning said gripping arm so that said gripping element is brought out from the space between the opened mould portions.

6. Improved apparatus according to claim 2 further including thrower means are provided for disengaging a moulded object from said moveable mould portion.

* * * * *